United States Patent
Krecisz

(10) Patent No.: US 12,310,278 B2
(45) Date of Patent: May 27, 2025

(54) SEED MATERIAL PELLETS

(71) Applicant: INSTANT SEED GMBH, Mahlow (DE)

(72) Inventor: Adam Krecisz, Berlin (DE)

(73) Assignee: INSTANT SEED GMBH (DE)

( * ) Notice: Subject to any disclaimer, the term of this patent is extended or adjusted under 35 U.S.C. 154(b) by 0 days.

(21) Appl. No.: 18/206,263

(22) Filed: Jun. 6, 2023

(65) Prior Publication Data

US 2024/0114820 A1   Apr. 11, 2024

Related U.S. Application Data

(63) Continuation of application No. 17/670,692, filed on Feb. 14, 2022, now abandoned, which is a continuation of application No. 15/301,080, filed as application No. PCT/EP2015/000732 on Apr. 7, 2015, now abandoned.

(30) Foreign Application Priority Data

Apr. 7, 2014   (DE) .................... 10 2014 005 451.9

(51) Int. Cl.
| A01C 1/06 | (2006.01) |
| A01C 1/04 | (2006.01) |
| A01C 7/08 | (2006.01) |
| A01C 21/00 | (2006.01) |

(52) U.S. Cl.
CPC .................. *A01C 1/06* (2013.01); *A01C 1/04* (2013.01); *A01C 7/085* (2013.01); *A01C 21/00* (2013.01)

(58) Field of Classification Search
None
See application file for complete search history.

(56) References Cited

U.S. PATENT DOCUMENTS

| 3,077,700 A | 2/1963 | George et al. |
| 4,145,206 A | 3/1979 | Ford |
| 6,088,957 A | 7/2000 | Kazemzadeh |
| 2006/0150489 A1 | 7/2006 | Legro et al. |
| 2010/0267554 A1 | 10/2010 | Madsen et al. |
| 2016/0151805 A1 | 6/2016 | Scheffler et al. |

FOREIGN PATENT DOCUMENTS

| AU | 7269974 A | 2/1976 |
| DE | 0849195 C | 12/1952 |
| DE | 4309679 A1 | 9/1994 |

OTHER PUBLICATIONS

File:Arachis-hypogaea-Texnik.
Naylor, "Effects of seed size and emergence time on subsequent growth of perennial ryegrass", New Phytol 84:313-318 (1980).
Sampler "Turfgrass Establishment Turfgrass Seed" U Tenn Extension, Oct. 2007.

*Primary Examiner* — Alton N Pryor
(74) *Attorney, Agent, or Firm* — Stuart H. Mayer; Kaplan Breyer Schwarz LLP

(57) ABSTRACT

The invention relates to seed material pellets of elongated form each comprising at least two seeds of elongated form, wherein the pellets consist of the seeds embedded within a matrix, wherein at least 80% of the seeds are oriented in directions essentially parallel to the pellets, and wherein the matrix does not comprise distinct layers of different constitution.

15 Claims, 2 Drawing Sheets

SEED MATERIAL PELLETS

FIELD OF THE INVENTION

The invention relates to seed material pellets of elongated form each comprising at least one seed of elongated form, wherein the pellets consist of the seeds embedded within a matrix, and wherein at least 80% of the seeds are oriented in directions essentially parallel to the pellets.

PRIOR ART AND BACKGROUND OF THE INVENTION

Seed material pellets of the kind described above are known from the document DE 10 2005 040 873 A1. The insofar known pellets comprise one single seed in each pellet, wherein the seed is coated with a matrix consisting of a plurality of layers of different composition. The production process of these pellets is complicated and related with high costs due to the multilayer structure of the matrix surrounding the single seed. Furthermore, the total weight of a pellet is rather low and only little above the weight of a single seed, resulting in that the pellets are easily washed away from the area where the pellets have been brought out, typically washing a higher number of pellets to a few parts of the area being a bit lower than the rest of the area. Consequently the area shows growth in a very inhomogeneous manner. This is in particular undesirable when planting a lawn or supplementing an existing lawn in places of need of additional grass plants.

The document DE 43 09 679 A1 discloses seed material pellets each comprising several seeds, wherein one seed is embedded in a core matrix and further seeds are embedded in a mantle matrix different from the core matrix, wherein the mantle matrix in addition comprises more than one layer. These seed material pellets are also difficult to make and consequently have high production costs.

The document DE 849 195 discloses a machine for making seed material pellets, wherein the resulting pellets are of spherical form. This particular machine is rather unsuitable for elongated seeds, since there is considerable risk to damage the seeds during the manufacturing process.

TECHNICAL OBJECT OF THE INVENTION

It is the technical object of the invention to provide seed material pellets comprising elongated seeds, which are easily manufactured, show low to absent damage in the embedded seeds, and provide uniform sowing results, even after watering of the area of sowing.

BRIEF DESCRIPTION OF THE DRAWINGS

FIG. 1a shows a longitudinal cross section through a seed material pellet and FIG. 1b shows a cross section in the plane A-A of FIG. 1a.

BASICS OF THE INVENTION AND PREFERRED EMBODIMENTS

Figure 1A:
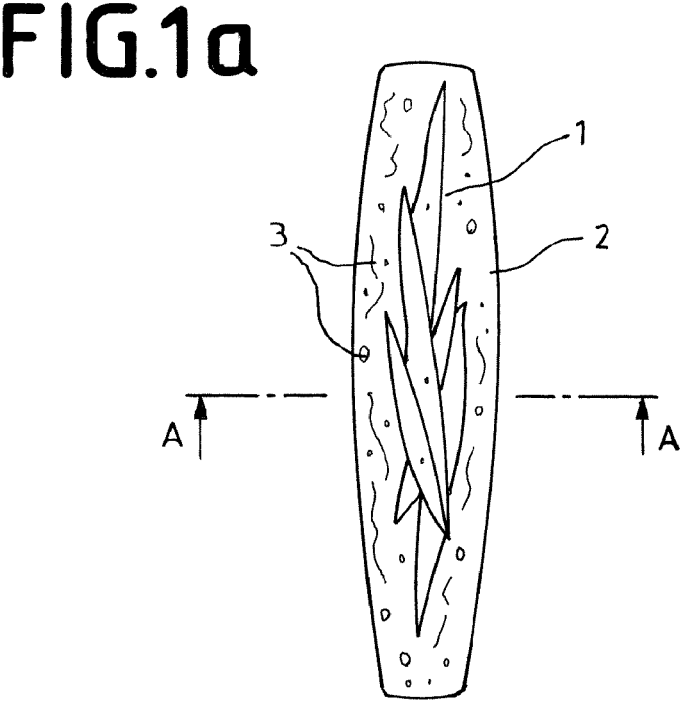
FIGS. 1a and 1b show two cross sections through a seed material pellet.

In order to achieve this technical object, the invention teaches seed material pellets of elongated form each comprising at least two seeds of elongated form, wherein the pellets consist of the seeds embedded within a matrix, wherein at least 60%, preferably at least 70%, more preferably at least 80%, most preferably at least 90%, of the seeds are oriented in directions essentially parallel to the pellets, wherein the matrix does not comprise distinct layers of different constitution.

The term "elongated form" is defined such that the pellet and the seed have a first dimension, which is the maximum extension of the pellet or seed. The pellet and the seed have a second dimension orthogonal to the first extension, which is smaller than the first extension. The ratio of the first extension to the second extension (hereinafter called form ratio) typically is in the range from 1.5:1 to 15:1, preferably in the range from 3:1 to 10:1. The general form may be essentially cylindrical, essentially in form of a barrel, or essentially a rotation ellipsoid (with or without cut off ends). In the latter cases the curvature may vary over the length of the pellet or seed, in particular also change signs. An example for a pellet with a curvature with changing sign is the dumbbell form or a chain of dumbbell forms. In the described cases, the cross section orthogonal to the longitudinal axis is essentially circular, but such cross section may as well be non-circular, e.g. of essentially elliptic form. In any case, the first dimension is the maximum extension parallel to a longitudinal axis, whereas the second dimension is the maximum extension within all cross sections orthogonal to the longitudinal axis.

The term "embedded" means that a seed is completely surrounded and in direct contact with the matrix material.

The term "essentially parallel" means that the longitudinal axes of the pellets and the seeds are essentially parallel, i.e. the angle of these two axes to each other is less than 45°, in particular less than 20°, preferably less than 10°.

Orientation of the seeds in directions essentially parallel to the pellets means that the respective longitudinal axes are essentially parallel.

According to the invention the matrix into which the seeds are embedded is essentially uniform in constitution (nevertheless allowing other particles than seeds being additionally embedded into the nevertheless uniform actual matrix material). In particular the seeds are not coated with materials constituting a core mantle structure.

Seed material pellets according to the invention are produced with simple manufacturing processes and thus cost effective in the production, due to the essentially uniform constitution of the matrix. Furthermore, seed material pellets of the invention have a total weight sufficient to ensure that subsequent watering after sowing will not wash away considerable amounts of the pellets. In fact, the seed material pellets of the invention may be engineered to any desired specific total weight without significantly altering the actual manufacturing process or the principle constitution of the pellets. This in the end ensures that a sowing area shows better uniformity in the distribution of plants growing from the seeds. Furthermore, the form ration of the pellets may be engineered according to the needs of a specific sowing area. For example for a well leveled sowing area a form ratio of the pellets may be comparatively low, i.e. in the range from 1.5:1 to 5:1. In sowing areas, which are not leveled, like embankments or hillsides, the form ratio preferably is comparatively high, i.e. for example in the range 3:1 to 10:1, by which the risk for the pellets to roll downhill and/or being washed away by water (rain or sprinkling) is significantly reduced.

In the following preferred but non-limiting embodiments are described in detail.

Preferably one pellet comprises 2 to 15 seeds. A pellet typically has a total weight in the range of 10 to 500 mg, preferably 50 to 250 mg. The weight of one seed may be in the range of 2 to 5 mg. The weight of (all) the seeds in one pellet is typically in the range of 4 to 75 mg.

The maximum diameter (second dimension) of the pellets may be in the range of 1 to 5 mm, preferably 1.5 to 2.5 mm. The maximum dimension (first dimension) of the pellets is higher than the maximum diameter of the pellets, preferably in the range of 6 to 20 mm.

The matrix is of essentially homogenous constitution. This means that the matrix material, wherein the seeds and optionally other particles are embedded, does (essentially) not vary in constitution spatially.

Particulate compounds different from the seeds may be additionally embedded in the matrix. Examples of such compounds comprise organic or inorganic fibers, preferably selected from the group consisting of natural treated or untreated organic fibers, wood fibers, coconut fibers, peat fibers, flax fibers, hemp fibers and cotton fibers, and/or particles comprising compounds selected from the group consisting of herbicides, insecticides, fungicides, soil chemistry humins, plant hormones, in particular for the stimulation of gibberellins, amino acids, carbohydrates, in particular glucose, ribose, galactose, unsaturated C11 to C28 fatty acids, ionic compounds comprising K, Mg, Mn, Fe and/or Cu ions, and fertilizers.

The matrix preferably is porous in order to allow water to enter into the matrix so that dissolution or disintegration of the matrix may be promoted in an enhanced manner. The porosity may in particular be in the range of 0.001 to 0.900, preferably 0.050 to 0.300, calculated as the total volume of cavities in the matrix divided through the total volume of the matrix, including the cavities.

Generally any matrix material useful in the field of seed materials may be employed. Preferably the matrix is selected form the group consisting of water soluble organic polymers, in particular polyvinyl alcohols (PVAL), polysaccharides, dextrin, starch, pectin, cellulose, hemicelluloses, cellulose acetate, ethyl cellulose, methylcellulose, oxyethylcellulose, oxypropylcellulose, carboxymethylcellulose, gelatin, lignin, plant gums, alginate, chitin, proteins, inorganic binders, planting earth, clay, and bentonite.

Generally the invention is useful for all kinds of seeds, which exhibit an elongated form. Preferably the seeds are selected from the group consisting of Poaceae, Cyperaceae, and Juncaceae having elongated form, in particular perennial grasses, lawn grasses, wheat, rye, oat, maize, millet, rice, teff, amaranth, buckwheat, and barley. Specifically preferred are lawn grass seeds.

Seed material pellets of the invention are obtainable in that the seeds are embedded in the matrix and the matrix comprising the seeds is formed to produce the pellets.

The invention also relates to a sowing method, wherein seed material pellets according to the invention are distributed onto the soil of a sowing area, the seed material pellets are optionally pressed into the soil, and the sowing area is watered.

The invention finally relates to the use of seed material pellets according to the invention for sowing within a sowing area, in particular for sowing a lawn.

Figure 1B:
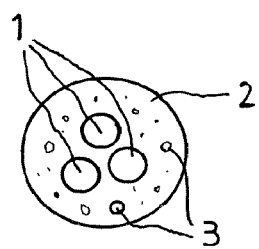
Figure 2:
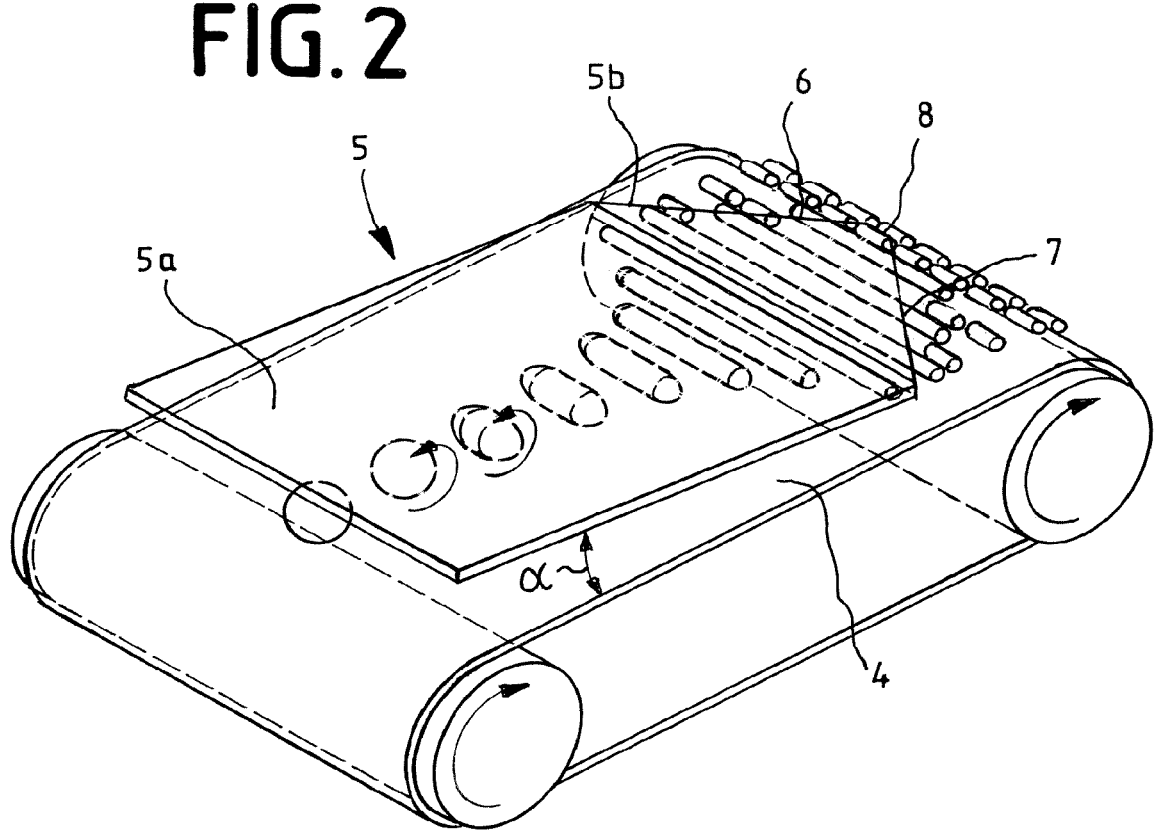
FIG. 2 shows a top view of an apparatus for the production of seed material pellets.
Figure 3:
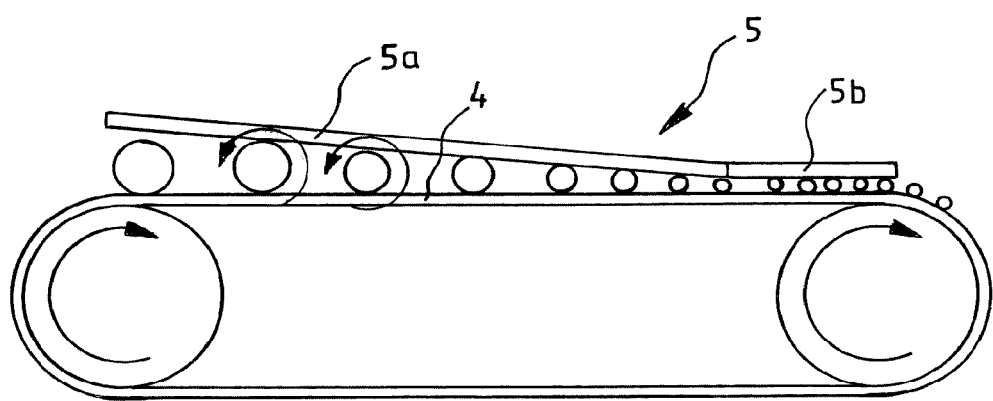
FIG. 3 shows a side view of an apparatus for the production of seed material pellets.

In the following the invention is explained in more detail with reference to non-limiting examples. The figures display:

FIG. 1: two cross sections through a seed material pellet of the invention (FIG. 1*a*: longitudinal cross section, FIG. 1*b*: cross section in the plane A-A of FIG. 1*a*), FIG. 2: an on top view of an apparatus for the production of seed material pellets of the invention, and FIG. 3: a side view of the subject matter of FIG. 2.

Example 1: First Seed Material Pellet

A first seed material pellet (see FIG. 1) is composed of 3 wheat seeds 1, which are embedded in a matrix 2 consisting of carboxycellulose. Further particles 3 are embedded into the matrix material being on one hand cotton fibers, and on the other hand grains containing Pyroxsulam 68 and Florasulam 23 as herbicides, Triadimenol as fungicides. The composition is provided in Table 1.

TABLE 1

| | |
|---|---|
| Seeds | 9 mg |
| Pyroxsulam 68 | 1 μg |
| Florasulam 23 | 1 μg |
| Triadimenol | 2.5 μg |
| Cotton fibers | 50 mg |
| Carboxycellulose | 140 mg |

Example 2: Second Seed Material Pellet

A second seed material pellet is composed of 3 wheat seeds 1, which are embedded in a matrix 2 consisting of alginate gel. Further particles 3 are embedded into the matrix material being on one hand cotton fibers, and on the other hand grains containing Pyroxsulam 68 and Florasulam 23 as herbicides, Triadimenol as fungicides. The composition is provided in Table 2.

TABLE 2

| | |
|---|---|
| Seeds | 9 mg |
| Pyroxsulam 68 | 1 μg |
| Florasulam 23 | 1 μg |
| Triadimenol | 2.5 μg |
| Coconut fibers | 50 mg |
| Alginate gel | 70 mg |

Example 3: Third Seed Material Pellet

A third seed material pellet is composed of 5 rice seeds 1, which are embedded in a matrix 2 consisting of a water soluble polyvinyl alcohol. Further particles 3 are embedded into the matrix material being grains containing benzsulfuronmethyl as herbicide and dimepiperate as seed safener. The composition is provided in Table 3.

TABLE 3

| | |
|---|---|
| Seeds | 12 mg |
| Benzsulfuronmethyl | 1 μg |
| Dimepiperate | 1 μg |
| Polyvinyl alcohol | 90 mg |

Example 4: Fourth Seed Material Pellet

A fourth seed material pellet is composed of 3 lawn grass seeds 1, which are embedded in a matrix 2 consisting of planting earth mixed with a polyvinyl alcohol (PVAL). Further particles 3 are embedded into the matrix material being coconut fibers. The composition is provided in Table 4.

TABLE 4

| Seeds | 7 mg |
|---|---|
| Coconut fibers | 50 mg |
| PVAL | 190 mg |

Example 5: Fifth Seed Material Pellet

A fifth seed material pellet is composed of 2 grass lawn seeds 1, which are embedded in a matrix 2 consisting of clay. The composition is provided in Table 5.

TABLE 5

| Seeds | 5 mg |
|---|---|
| Clay | 170 mg |

Example 6: Sixth Seed Material Pellet

A sixth seed material pellet is composed of 5 rye seeds 1, which are embedded in a matrix 2 consisting of gelatin. Further particles 3 are embedded into the matrix material being grains containing Pyroxsulam 68 and Florasulam 23 as herbicides, Triadimenol as fungicides. The composition is provided in Table 6.

TABLE 1

| Seeds | 15 mg |
|---|---|
| Pyroxsulam 68 | 1 µg |
| Florasulam 23 | 1 µg |
| Triadimenol | 2.5 µg |
| Gelatin | 140 mg |

Example 7: Seventh Seed Material Pellet

A seventh seed material pellet is essentially the seed material described in Example 5, additionally comprising 50 mg coconut fibers and a total weight of 20 mg common lawn fertilizer grains containing urea and nitrate nitrogen.

Example 8: Eighth Seed Material Pellet

An eighth seed material pellet is essentially the seed material described in Example 7, but without the coconut fibers.

Example 9: Device and Method for the Production of the Seed Material Pellets of the Invention FIGS. 2 and 3 show an apparatus for making seed material pellets of the invention. This apparatus comprises a conveyor belt 4. A plate 5 is arranged above the conveyor belt 4. This plate consists of a first region 5a and a second region 5b. The first region 5a stands in an angle of 3° to the surface of the conveyor belt 4, such that the space between the first region 5a and the conveyor belt 4 becomes narrower in the run direction of the conveyor belt surface (see FIG. 3). The second region 5b, in contrast, is essentially parallel to surface of the conveyor belt 4. The second region 5b has side edges 6, 7, which approach one another forming the tip 8 (see FIG. 1).

The pellets according to the invention are made as following. Initially, seeds, matrix material and optionally other particles are mixed with each other such that the weight ratio matrix/seeds is for example about 8. Then spherical pellets are formed from this mixture by in the art well known processes, wherein each spherical pellet has a total weight of about 1 to 5 g and contains about 50 seeds. The seeds have no preferred orientation within these spherical pellets.

In order to transform these spherical pellets into the pellets of the invention, the former are supplied to the apparatus of FIGS. 3 and 4 at a position where the distance of the plate 5 to the conveyor belt 4 is largest. The conveyor belt 4 transports the spherical pellets in direction of the second region 5b of the plate 5, thereby increasingly compressing the pellets between the first region 5a of the plate 5 and the conveyor belt 4, such that the spherical pellets are transformed into cylinders. Such transformation is possible due to the ductile properties of the matrix material. Along the runway between the first region 5a of the plate and the conveyor belt 4 the diameter of the cylinders decreases and the length of the cylinders increases. During this rolling process not only the form of the pellets is transformed from a sphere to a cylinder, but at the same time the elongate seeds in the pellets become oriented essentially in parallel to the cylinder axis of a pellet. Without wanting to be bound to theory, the reason for this orientation of the seeds is that upon the rotation and transportation between the plate 5 and the conveyor belt 4 transverse forces act on the seeds within the matrix, thus rotating seeds into orientations, which are essentially parallel to the rotational axis of the pellets, which is the cylinder axis of the pellets. A great advantage of the process using the described apparatus is that the seeds are rotated very slowly and carefully within the matrix into the orientation of the cylinder axis, thus avoiding that seeds are irreversibly harmed such that they will not be of any use any more. When the cylindrical pellets leave the space between the first region 5a of the plate 5 and the conveyor belt 4, they enter into the second region 5b of the plate 5 and the conveyor belt 4. Here the side edges 6, 7 of the second region 5b act as separation elements, effecting that a cylindrical pellet coming from the first region 5a will be divided into a number of shorter cylindrical pellets, in the example about 8. The resulting cylindrical pellets leaving the apparatus at the right hand are the final pellets of the invention. Typically a drying step may be incorporated before the pellets go to the customer.

The invention claimed is:

1. A seed material pellet of elongated form comprising at least two seeds of elongated form, wherein the pellet comprises seeds embedded within a matrix, wherein at least 60% of the seeds are oriented in directions essentially parallel to the pellet, and wherein the matrix does not comprise distinct layers of different constitution,
    wherein the matrix is a water soluble organic polymer
    wherein the pellet has a total weight in the range of 50 to 250 mg,
    wherein weight of one of the at least two seeds is in the range of 2 to 5 mg and/or wherein the weight of the seeds in a pellet is in the range of 4 to 75 mg,
wherein the maximum diameter of the pellet is in a range of 1 to 2.5 mm, and wherein the matrix is porous with a porosity of 0.001 to 0.900, calculated as total volume of cavities in the matrix divided through the total volume of the matrix, including the cavities.

2. The seed material pellet according to claim 1, comprising 2 to 15 seeds.

3. The seed material pellet according to claim 1, wherein the pellet has a maximum dimension that is higher than the maximum diameter of the pellet.

4. The seed material pellet according to claim 1, wherein the matrix is of essentially homogenous constitution.

5. The seed material pellet according to claim 4, wherein a particulate compound different from the seeds is additionally embedded in the matrix.

6. The seed material pellet according to claim 1, wherein the water soluble organic polymer is selected from polyvinyl alcohols, polysaccharides, dextrin, starch, pectin, cellulose, hemicelluloses, cellulose acetate, ethyl cellulose, methylcellulose, oxyethylcellulose, oxypropylcellulose, carboxymethylcellulose, gelatin, lignin, plant gums, alginate gels, chitin, proteins, inorganic binders, planting earth, clay, and bentonite.

7. The seed material pellet according to claim 5, wherein the particulate compound consists of organic or inorganic fibers, treated or untreated.

8. The seed material pellet according to claim 1, obtainable in that the seeds are embedded in the matrix and the matrix comprising the seeds is formed to produce the pellet.

9. The seed material pellet according to claim 1, wherein the seeds are seeds from plants selected from the group consisting of Poaceae, Cyperaceae, and Juncaceae having elongate seeds.

10. A sowing method, comprising steps of distributing the seed material pellets according to claim 1 onto a soil of a sowing area, optionally pressing the seed material pellets into the soil, and watering the sowing area.

11. The seed material pellet according to claim 1, wherein the pellet has a maximum diameter in the range of 1.5 to 2.5 mm.

12. The seed material pellet according to claim 3, wherein the maximum dimension of the pellet is in the range of 6 to 20 mm.

13. The seed material pellet according to claim 1, wherein the matrix is porous with a porosity of 0.050 to 0.300, calculated as the total volume of cavities in the matrix divided through the total volume of the matrix, including the cavities.

14. The seed material pellet according to claim 9, wherein the elongated seeds are seeds from perennial grasses, lawn grasses, wheat, rye, oat, maize, millet, rice, teff, and barley.

15. The seed material pellet according to claim 7, wherein the particulate compound is selected from the group consisting of natural treated or untreated organic fibers, wood fibers, coconut fibers, peat fibers, flax fibers, hemp fibers and cotton fibers, and/or particles comprising compounds selected from the group consisting of herbicides, insecticides, fungicides, soil chemistry humins, plant hormones, for the stimulation of gibberellins, amino acids, carbohydrates, glucose, ribose, galactose, unsaturated C11 to C28 fatty acids, ionic compounds comprising K, Mg, Mn, Fe and/or Cu ions, and fertilizers.

* * * * *